(12) United States Patent
Miyazawa

(10) Patent No.: US 12,724,253 B2
(45) Date of Patent: Sep. 1, 2026

(54) ZOOM LENS, IMAGE PICKUP APPARATUS, AND IMAGE PICKUP SYSTEM

(71) Applicant: CANON KABUSHIKI KAISHA, Tokyo (JP)

(72) Inventor: Nobuyuki Miyazawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 18/741,924

(22) Filed: Jun. 13, 2024

(65) Prior Publication Data

US 2024/0427125 A1 Dec. 26, 2024

(30) Foreign Application Priority Data

Jun. 23, 2023 (JP) ................................ 2023-103651

(51) Int. Cl.
*G02B 15/14* (2006.01)

(52) U.S. Cl.
CPC ............................ *G02B 15/144511* (2019.08)

(58) Field of Classification Search
CPC .......... G02B 15/144511; G02B 15/177; H04N 23/55; H04N 23/69
USPC ........................................................ 359/694
See application file for complete search history.

(56) References Cited

U.S. PATENT DOCUMENTS 4,653,873 A * 3/1987 Kawamura .......... G02B 15/177 359/686
5,835,272 A * 11/1998 Kodama ............. G02B 27/646 359/740
6,285,509 B1 9/2001 Nakayama
6,317,271 B1 * 11/2001 Sensui ........... G02B 15/144511 359/686
6,710,931 B1 * 3/2004 Misaka ................ G02B 15/177 359/686
8,842,210 B2 * 9/2014 Hagiwara ............ G02B 13/009 359/686
9,195,032 B2 * 11/2015 Ono ................... G02B 13/0065
9,726,866 B2 8/2017 Miyazawa
9,851,582 B2 12/2017 Miyazawa
9,880,376 B2 1/2018 Miyazawa
10,120,173 B2 11/2018 Miyazawa
10,168,546 B2 1/2019 Miyazawa
(Continued)

FOREIGN PATENT DOCUMENTS

JP 2005-283648 A 10/2005
JP 2017-003647 A 1/2017
(Continued)

OTHER PUBLICATIONS

Search Report issued by the UK Patent Office on Nov. 18, 2024 in corresponding GB Patent Application No. 2408549.0.

*Primary Examiner* — William R Alexander
(74) *Attorney, Agent, or Firm* — Carter, DeLuca & Farrell LLP

(57) ABSTRACT

A zoom lens includes a plurality of lens units including, in order from an object side to an image side, a first lens unit having negative refractive power, a second lens unit having positive refractive power, a third lens unit having negative refractive power, and a fourth lens unit having positive refractive power. A distance between adjacent lens units changes during zooming. The second lens unit includes at least one negative lens. Predetermined inequalities are satisfied.

15 Claims, 12 Drawing Sheets

(56) References Cited

U.S. PATENT DOCUMENTS 10,247,928 B2 * 4/2019 Nishio .................. G02B 13/18
10,295,806 B2 5/2019 Miyazawa
11,194,138 B2 * 12/2021 Yokoya .............. G02B 15/1425
2003/0086181 A1 * 5/2003 Murata ................ G02B 15/177 359/680
2005/0013015 A1 * 1/2005 Sensui ........... G02B 15/144511 359/680
2006/0221461 A1 * 10/2006 Shibayama .... G02B 15/144511 359/686
2009/0310225 A1 12/2009 Matsusaka
2012/0327276 A1 * 12/2012 Ono .................. G02B 13/0065 348/E5.055
2013/0314584 A1 * 11/2013 Hagiwara ............ G02B 13/009 359/686
2015/0281588 A1 * 10/2015 Izuhara .................. H04N 23/60 359/680
2016/0041367 A1 * 2/2016 Ono ..................... G02B 13/009 359/686
2016/0341939 A1 * 11/2016 Koida ............ G02B 15/144511
2017/0038568 A1 * 2/2017 Ono .................. G02B 13/0065
2018/0100995 A1 * 4/2018 Nishio ........... G02B 15/144511
2018/0224641 A1 * 8/2018 Kawamura ........ G02B 27/0025
2021/0018721 A1 1/2021 Shinzato
2025/0327990 A1 * 10/2025 Nagami ............... G02B 15/177

FOREIGN PATENT DOCUMENTS

JP 2019-174711 A 10/2019
JP 2020-091436 A 6/2020
JP 2022-163899 A 10/2022

* cited by examiner

M S
d
g
Fno= 2.58
ω= 10.3°
ω= 10.3°
ω= 10.3°
-0.100 0.100
SPHERICAL ABERRATION
-0.100 0.100
ASTIGMATISM
-30.000 30.000
DISTORTION (%)
-0.020 0.020
CHROMATIC ABERRATION d
g
M
S
Fno= 4.73
ω= 13.1°
ω= 13.1°
ω= 13.1°
-0.100
0.100
-0.100
0.100
-30.000
30.000
-0.020
0.020
SPHERICAL ABERRATION
ASTIGMATISM
DISTORTION (%)
CHROMATIC ABERRATION

ZOOM LENS, IMAGE PICKUP APPARATUS, AND IMAGE PICKUP SYSTEM

BACKGROUND

Technical Field

One of the aspects of the embodiments relates to a zoom lens, which is suitable for digital video cameras, digital still cameras, broadcasting cameras, film-based cameras, surveillance cameras, and the like.

Description of Related Art

Zoom lenses have conventionally been known that include, in order from the object side to the image side, first to fourth lens units having negative, positive, negative, and positive refractive powers, and have a small size and can efficiently secure a magnification variation ratio. Japanese Patent Laid-Open No. 2005-283648 discloses a zoom lens that includes, in order from the object side to the image side, first to fourth lens units having negative, positive, negative, and positive refractive powers, and has a magnification variation ratio of about 5 times and a half angle of view of about 39 degrees, wherein all the lens units move during zooming. Japanese Patent Laid-Open No. 2019-174711 discloses a zoom lens that includes, in order from the object side to the image side, first to fourth lens units having negative, positive, negative, and positive refractive powers, and has a magnification variation ratio of about twice, and a half angle of view is about 63 degrees, wherein the first to third lens units move during zooming, and the first lens unit includes five lenses.

In the zoom lens disclosed in Japanese Patent Laid-Open No. 2005-283648, in an attempt for a wider angle while the disclosed lens arrangement at the wide-angle end is maintained, the shape of the first lens unit cannot be established due to the enlargement of the front lens and the number of lenses in the first lens unit is to be increased. As a result, the diameter, overall length, and weight may increase.

In the zoom lens disclosed in Japanese Patent Laid-Open No. 2019-174711, due to the large number of lenses in the first lens unit, the first lens unit and thus the zoom lens are unsuitable in terms of the diameter, overall length, and weight. Moreover, since the magnification variation ratio is about twice, the diameter, overall length, and weight may further be increased in an attempt to increase the magnification variation.

SUMMARY

A zoom lens according to one aspect of the disclosure includes a plurality of lens units including, in order from an object side to an image side, a first lens unit having negative refractive power, a second lens unit having positive refractive power, a third lens unit having negative refractive power, and a fourth lens unit having positive refractive power. A distance between adjacent lens units changes during zooming. The second lens unit includes at least one negative lens. The following inequalities are satisfied:

$$20 < \nu 2n < 28$$

$$0.00 < f2/f4 < 0.40$$

-continued $$12 < Lw/fw < 55$$

where ν2n is a minimum value of an Abbe number of the negative lens, f2 is a focal length of the second lens unit, f4 is a focal length of the fourth lens unit, Lw is an overall optical length of the zoom lens at a wide-angle end, and fw is a focal length of the zoom lens at the wide-angle end. An image pickup apparatus and an image pickup system each having the above zoom lens also constitute another aspect of the disclosure.

Further features of various embodiments of the disclosure will become apparent from the following description of embodiments with reference to the attached drawings.

DESCRIPTION OF THE EMBODIMENTS

Figure 1:
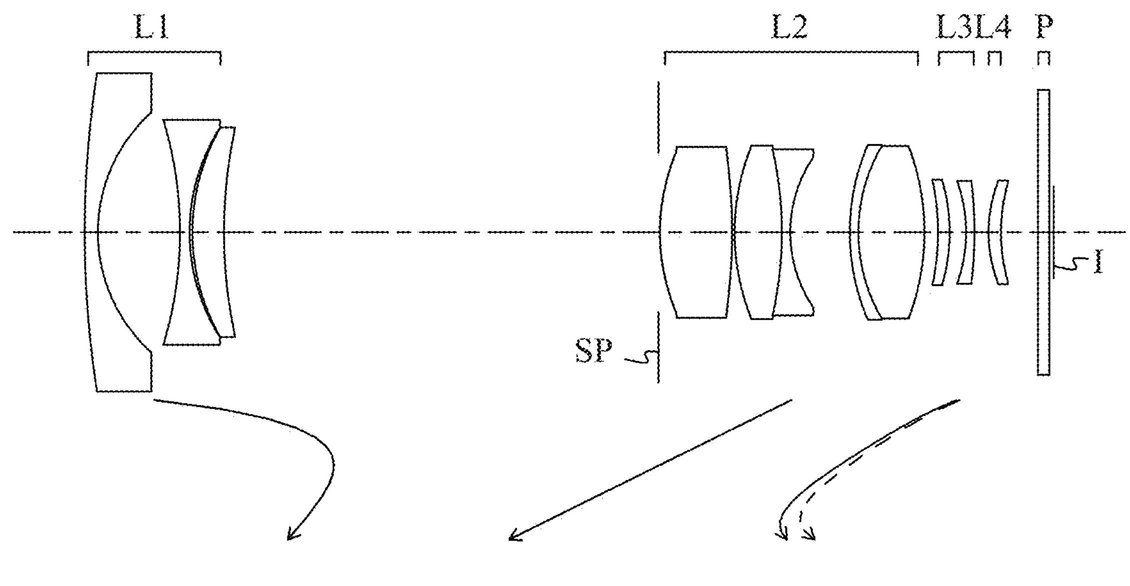
FIG. 1 is a sectional view of a zoom lens according to Example 1.
Figure 2A:
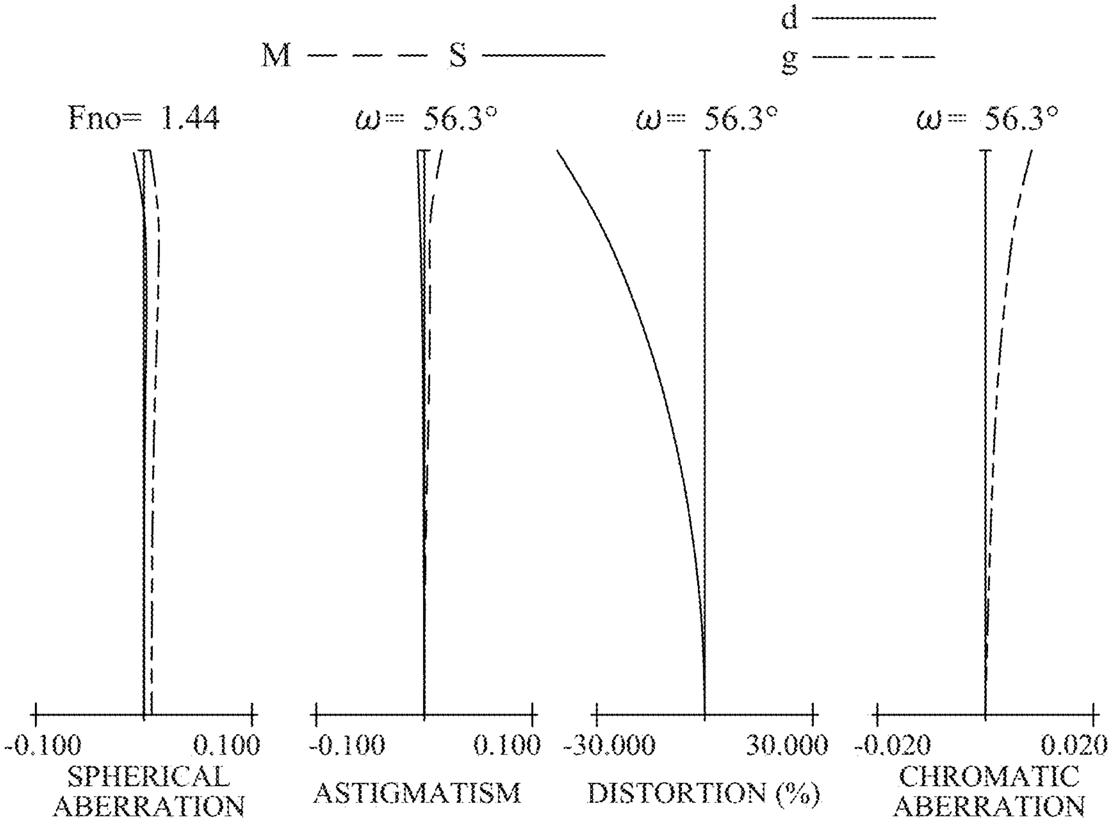
FIGS. 2A, 2B, and 2C are aberration diagrams of the zoom lens according to Example 1 at a wide-angle end, intermediate focal length, and telephoto end.
Figures 2B, 2C:
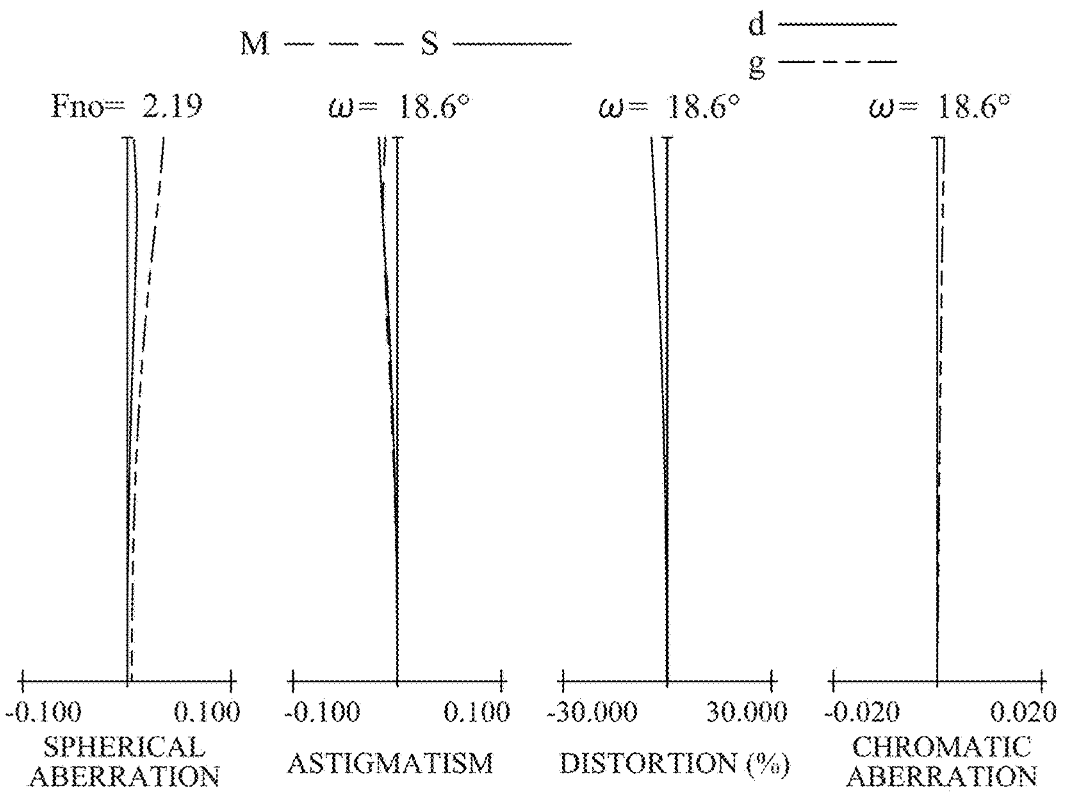
Figure 3:
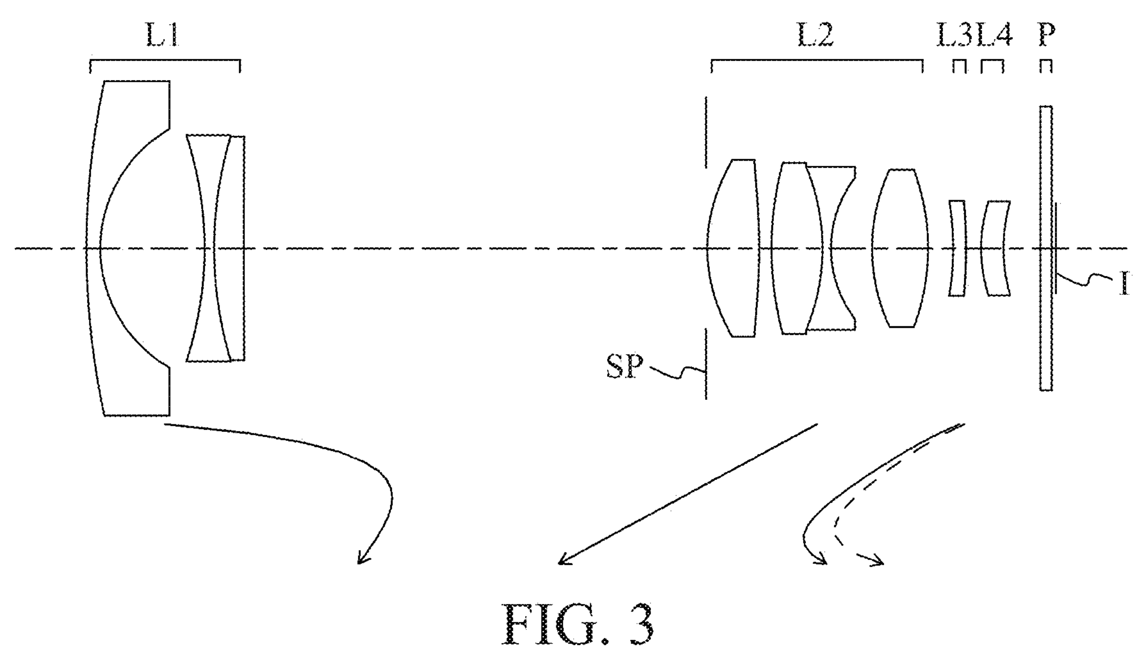
FIG. 3 is a sectional view of a zoom lens according to Example 2.
Figure 4A:
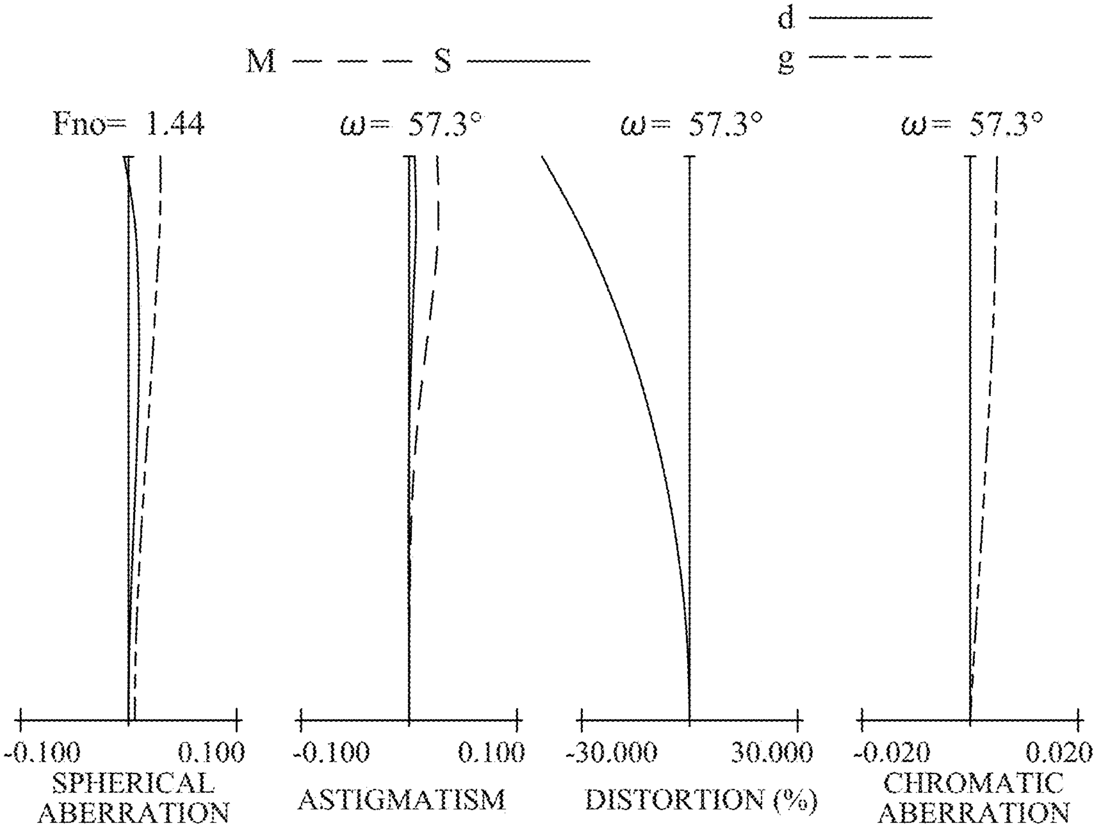
FIGS. 4A, 4B, and 4C are aberration diagrams of the zoom lens according to Example 2 at a wide-angle end, intermediate focal length, and telephoto end.
Figure 4B:
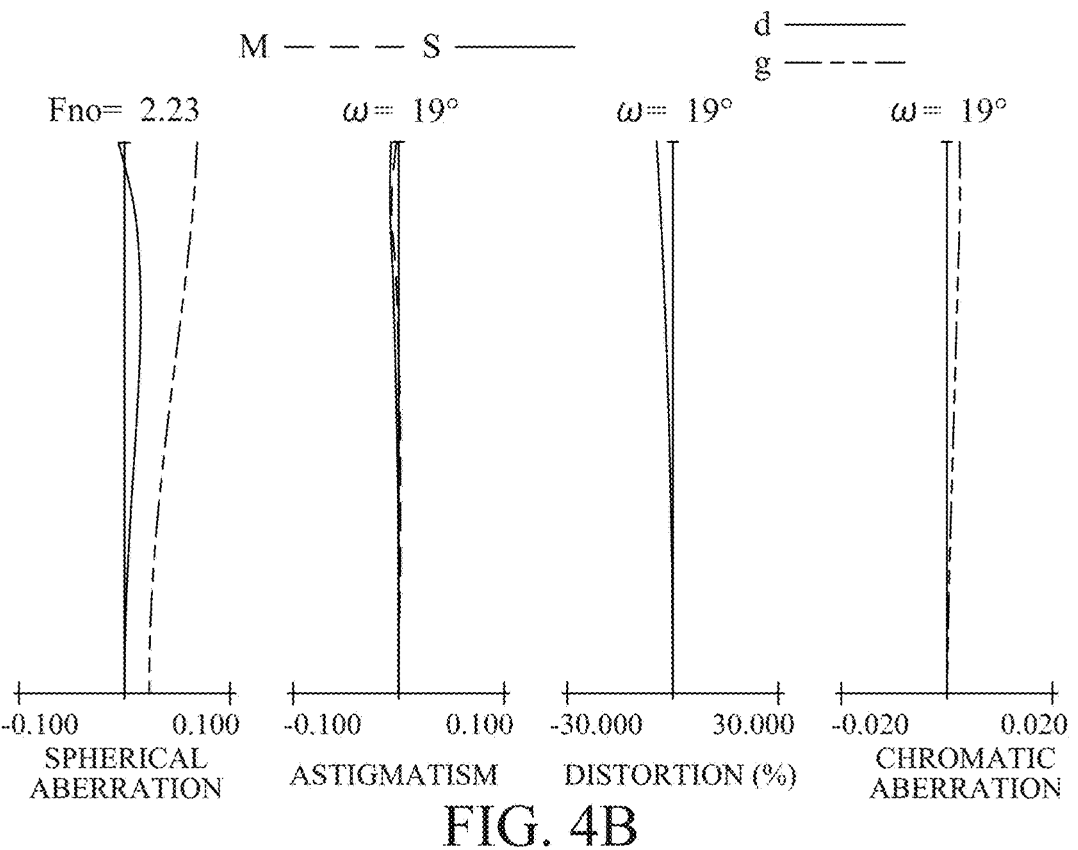
Figure 4C:
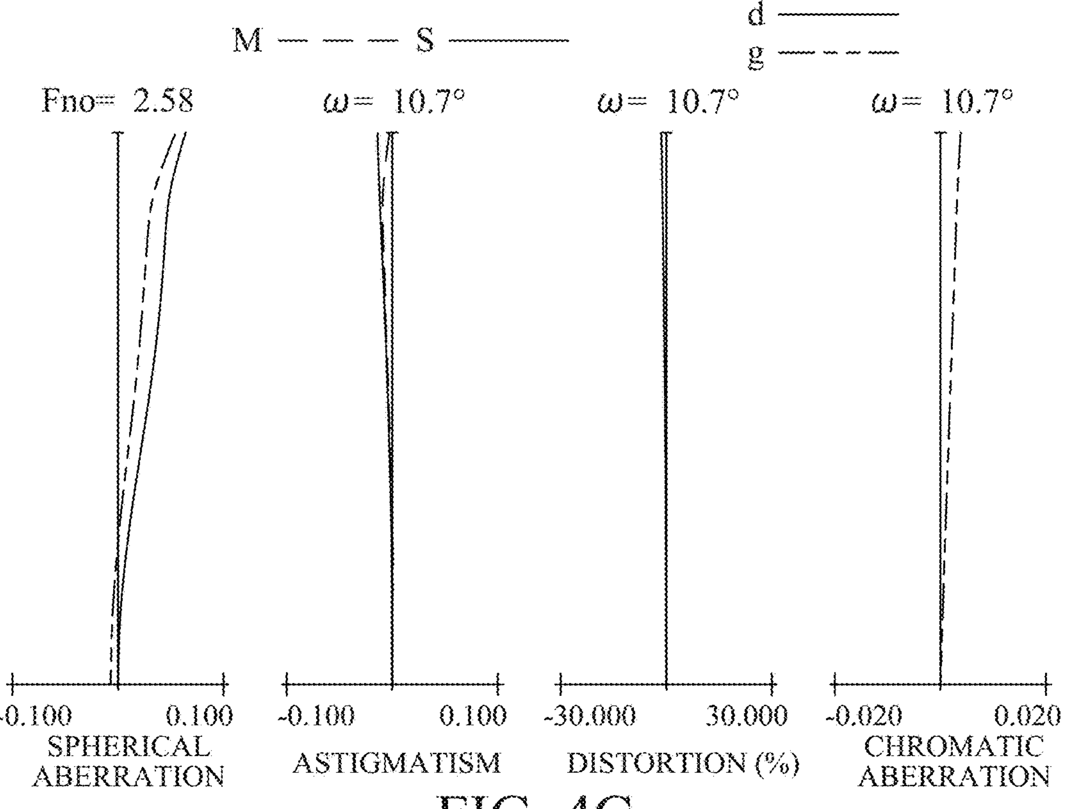
Figure 5:
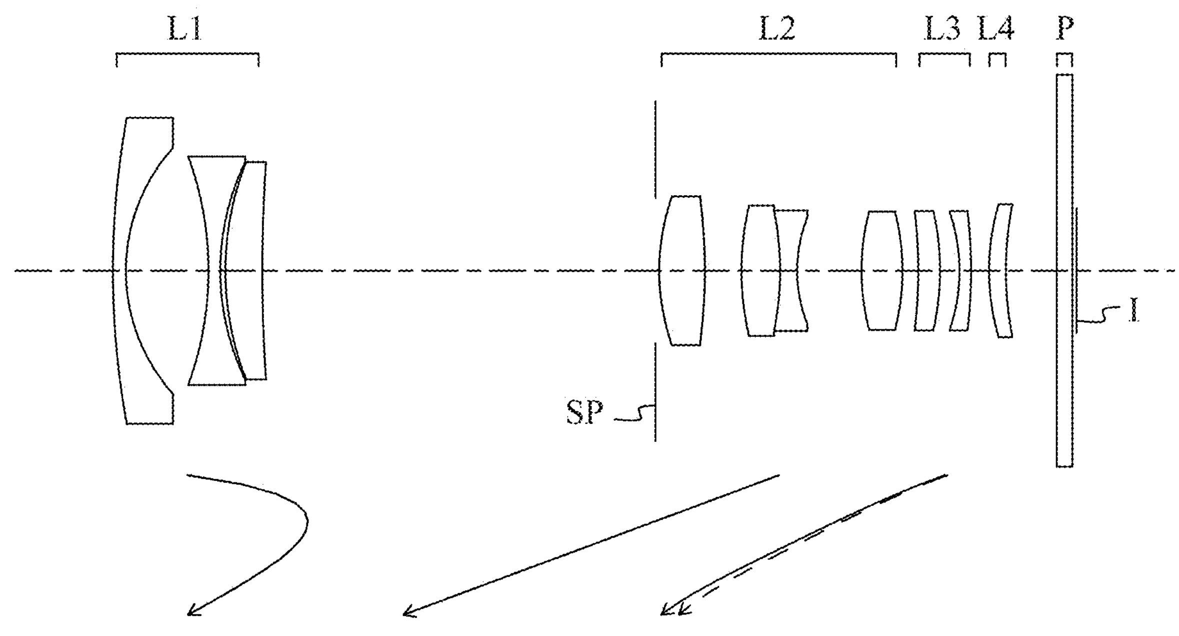
FIG. 5 is a sectional view of a zoom lens according to Example 3.
Figure 6A:
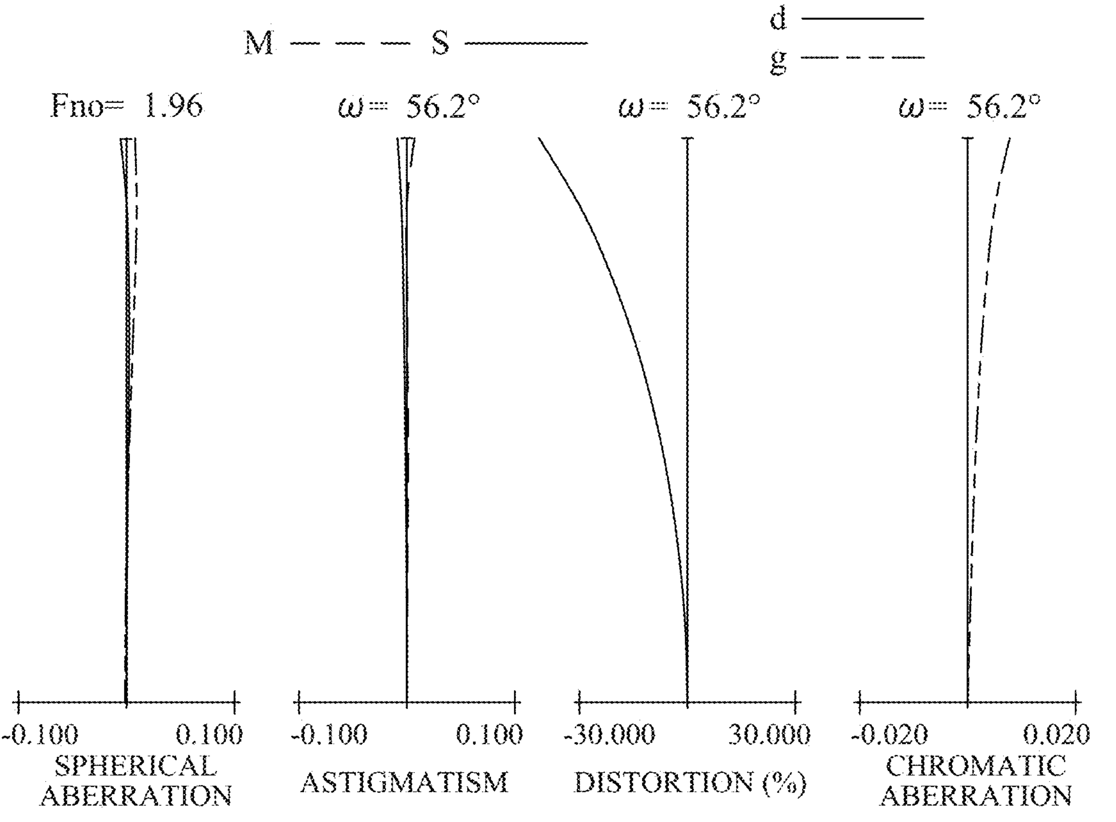
FIGS. 6A, 6B, and 6C are aberration diagrams of the zoom lens according to Example 3 at a wide-angle end, intermediate focal length, and telephoto end.
Figure 6B:
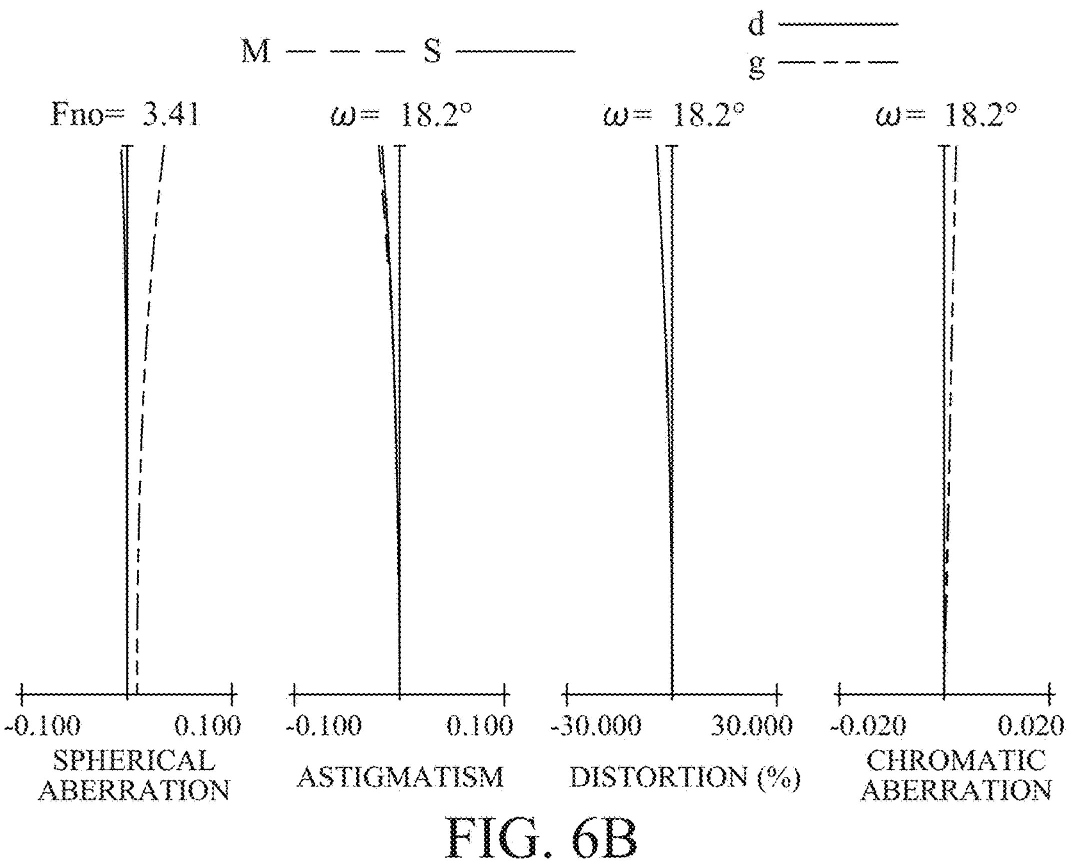
Figure 6C:
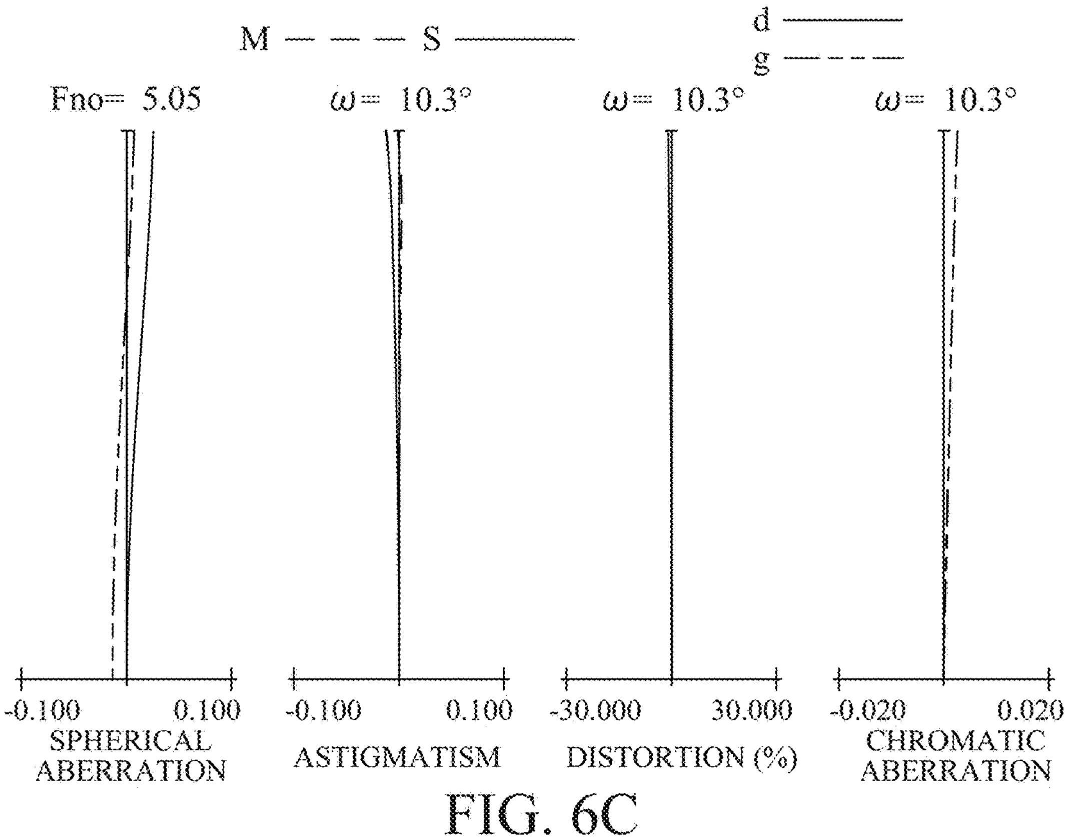
Figure 7:
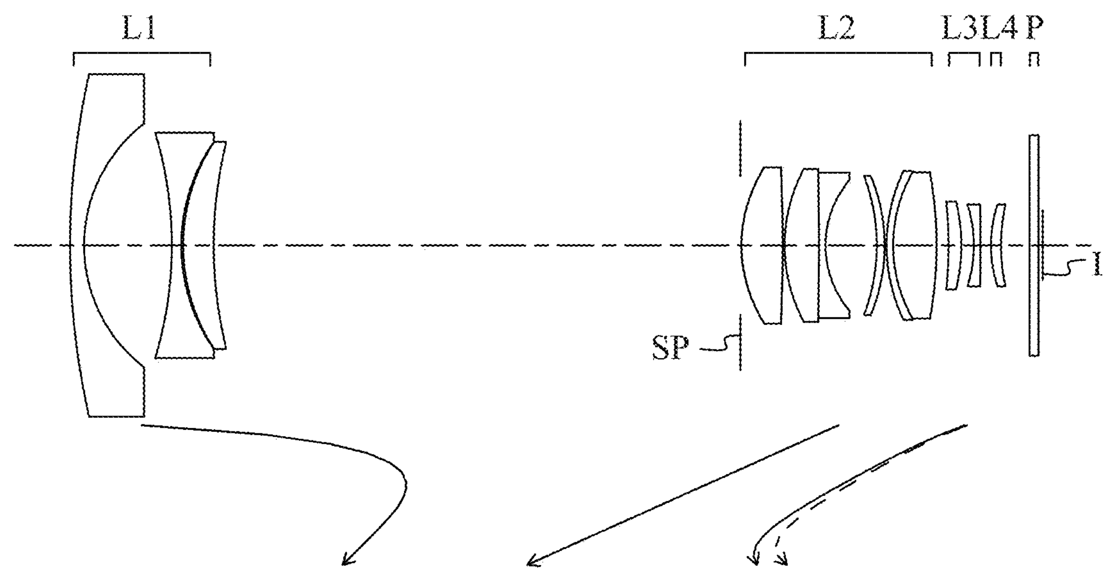
FIG. 7 is a sectional view of a zoom lens according to Example 4.
Figure 8A:
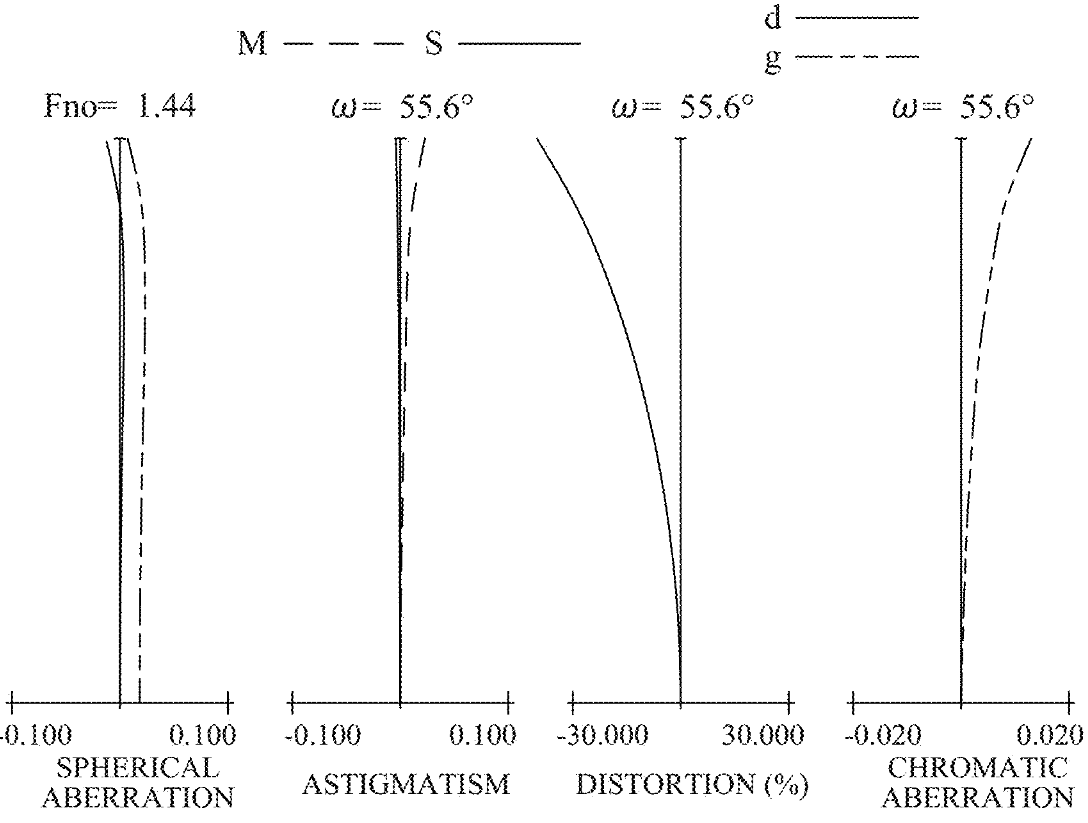
FIGS. 8A, 8B, and 8C are aberration diagrams of the zoom lens according to Example 4 at the wide-angle end, intermediate focal length, and telephoto end.
Figure 8B:
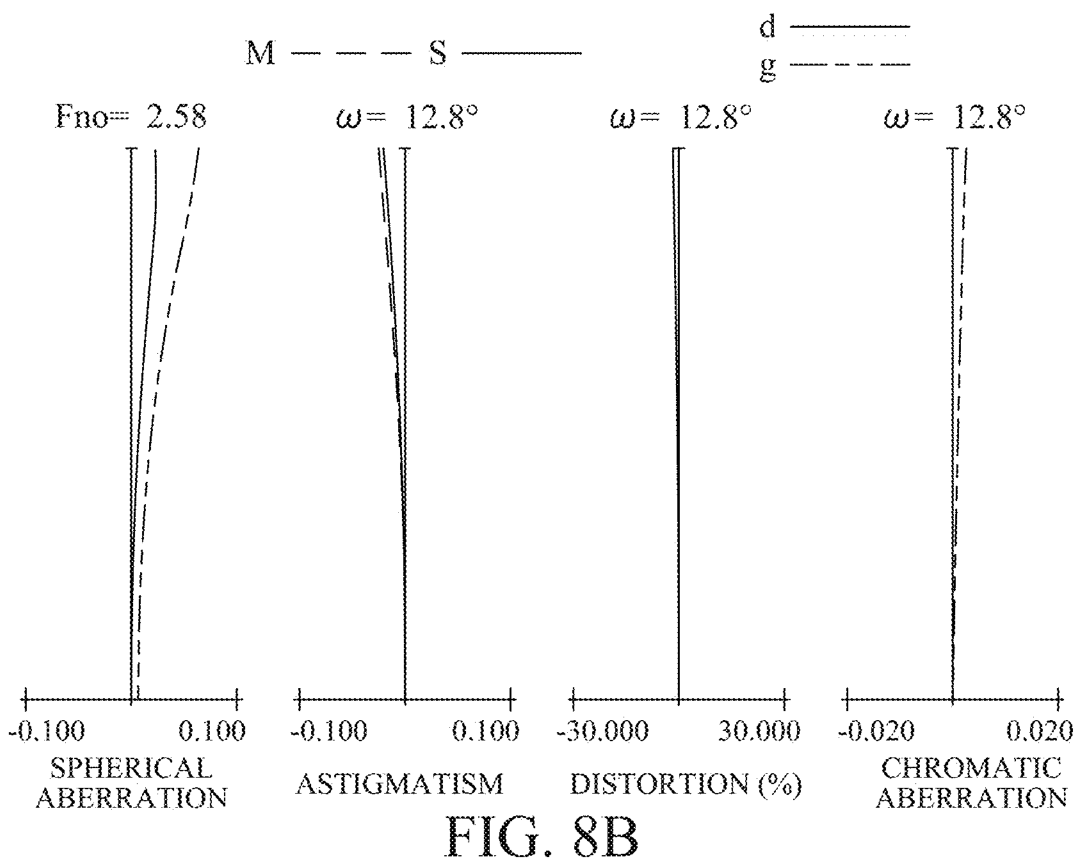
Figure 8C:
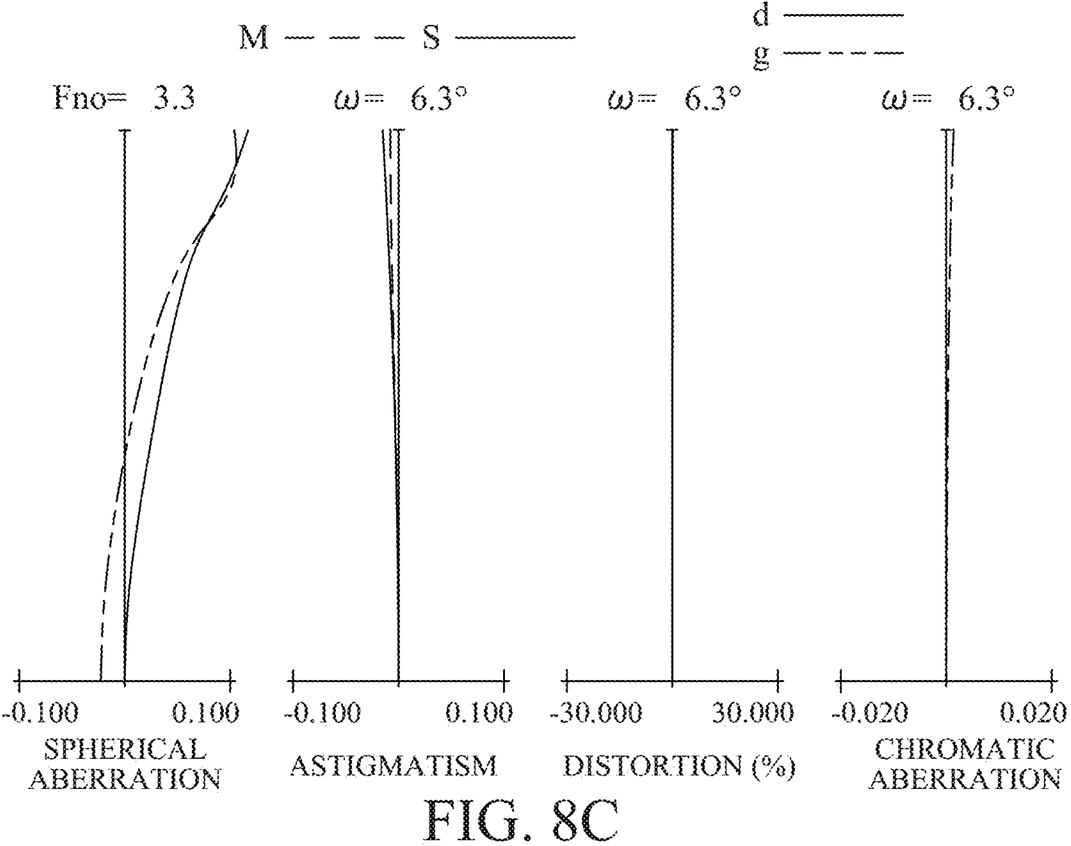
Figure 9:
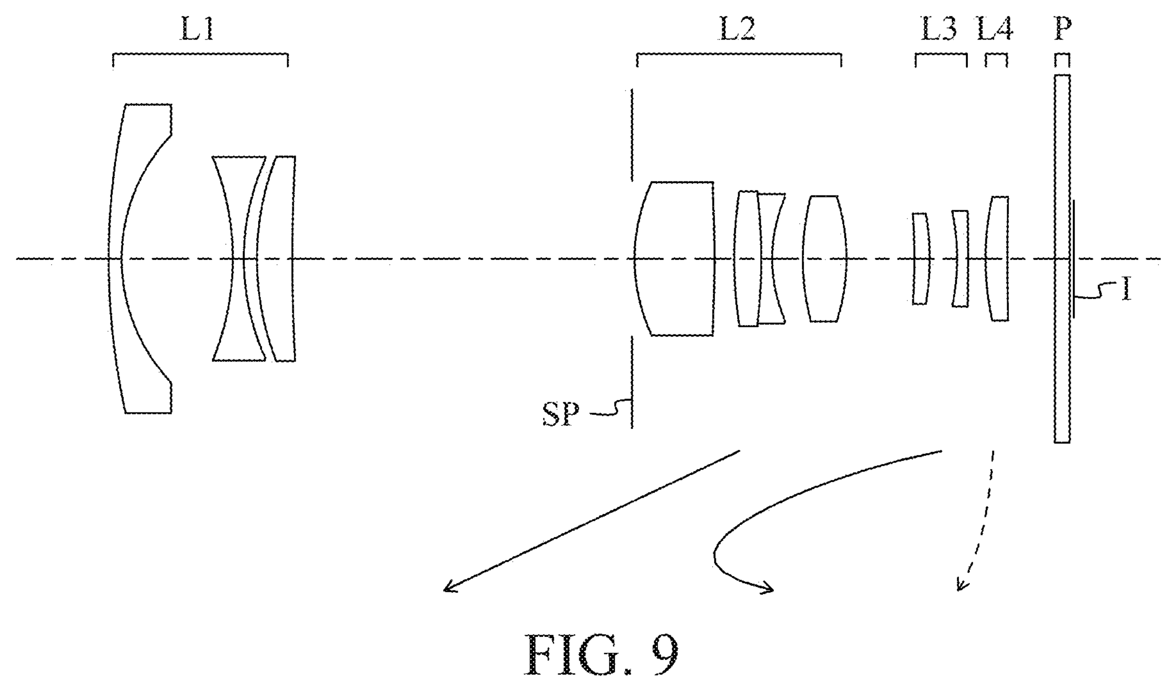
FIG. 9 is a sectional view of a zoom lens according to Example 5.
Figure 10A:
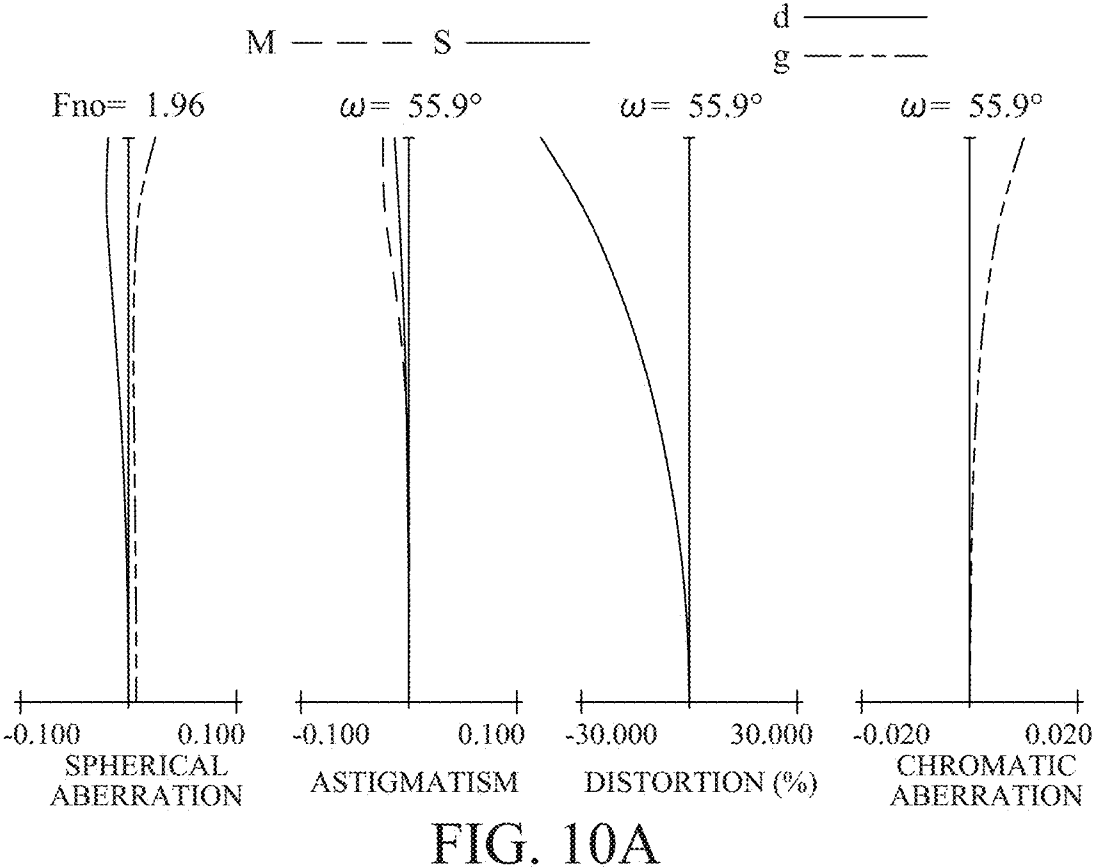
FIGS. 10A, 10B, and 10C are aberration diagrams of the zoom lens according to Example 5 at the wide-angle end, intermediate focal length, and telephoto end.
Figures 10B, 10C:
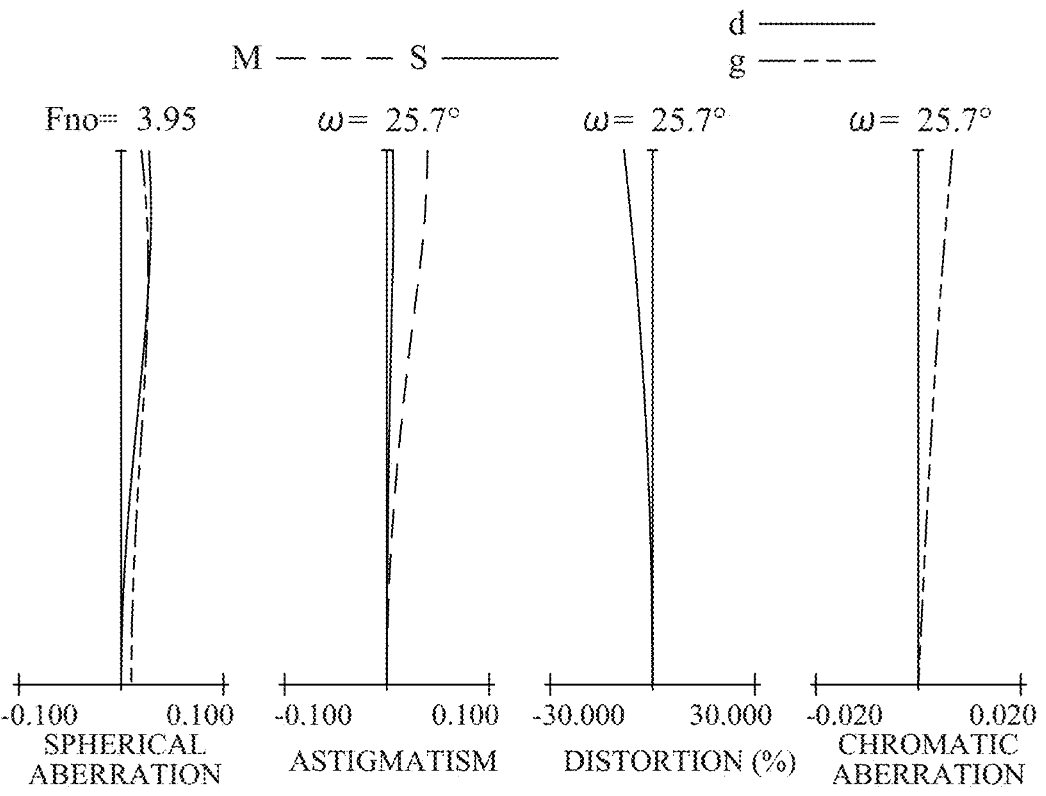

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, and 9 are sectional views of zoom lenses according to Examples 1 to 5, respectively. The zoom lens according to each example is an optical system for an image pickup apparatus such as a digital video camera, a digital still camera, a broadcasting camera, a film-based camera, and a surveillance camera.

In each sectional view, a left side is an object side and a right side is an image side. The zoom lens according to each example includes a plurality of lens units. In this specification, a lens unit is a group of lenses that move or stand still during zooming. That is, in the zoom lens according to each example, a distance between adjacent lens units changes during zooming. The lens unit may include one or more lenses. The lens unit may include an aperture stop.

The zoom lens according to each example includes a plurality of lens units as described above. The plurality of lens units include, in order from the object side to the image side, a first lens unit L1 having negative refractive power, a second lens unit L2 having positive refractive power, a third lens unit L3 having negative refractive power, and a fourth lens unit L4 having positive refractive power.

SP represents an aperture stop (diaphragm). P represents a glass block such as a face plate of a CCD sensor or a low-pass filter. I represents an image plane, and in a case where the zoom lens according to each example is used as an imaging optical system of a digital still camera or a digital video camera, an imaging surface of a solid-state image sensor (photoelectric conversion element) such as a CCD sensor or a CMOS sensor is placed on the image plane I. In a case where the zoom lens according to each example is used as an imaging optical system of a film-based camera, a photosensitive surface corresponding to the film surface is placed on the image plane I.

In the zoom lens according to each example, each lens unit is moved in an arrow direction during zooming from the wide-angle end to the telephoto end. A solid line and a dotted line are moving loci during focusing on an object at infinity and an object at a short distance, respectively. In each example, the second lens unit L2 at the telephoto end is located on the object side of the second lens unit L2 at the wide-angle end.

In the zoom lenses according to Examples 1 to 4, the third lens unit L3 functions as a focus unit, and in the zoom lens according to Example 5, the fourth lens unit L4 functions as a focus unit. The first lens unit L1 may function as a focus unit, or the first lens unit L1 and the second lens unit L2 may function integrally as a focus unit.

FIGS. 2A, 4A, 6A, 8A, and 10A are aberration diagrams of the zoom lenses according to Examples 1 to 5 at the wide-angle ends, respectively. FIGS. 2B, 4B, 6B, 8B, and 10B are aberration diagrams of the zoom lenses according to Examples 1 to 5 at intermediate focal lengths, respectively. FIGS. 2C, 4C, 6C, 8C, and 10C are aberration diagrams of the zoom lenses according to Examples 1 to 5 at the telephoto ends, respectively.

In a spherical aberration diagram, Fno represents an F-number and indicates spherical aberration amounts for the d-line (wavelength 587.6 nm) and the g-line (wavelength 435.8 nm). In an astigmatism diagram, S represents an astigmatism amount on a sagittal image plane, and M represents an astigmatism amount on a meridional image plane. A distortion aberration diagram illustrates a distortion amount for the d-line. A chromatic aberration diagram illustrates a chromatic aberration amount for the g-line. ω is an imaging half angle of view) (°).

A description will be given of the characteristic configuration of the zoom lens according to each example.

The second lens unit L2 includes at least one negative lens. Thereby, longitudinal chromatic aberration can be corrected.

The zoom lens according to each example satisfies the following inequalities (1) to (3):

$$20 < \nu 2n < 28 \tag{1}$$

$$0.00 < f2/f4 < 0.40 \tag{2}$$

-continued $$12 < Lw/fw < 55 \tag{3}$$

where ν2n is a minimum value of the Abbe number of the negative lens included in the second lens unit L2, f2 is a focal length of the second lens unit L2, f4 is a focal length of the fourth lens unit L4, Lw is an overall optical length (overall lens length) of the zoom lens at the wide-angle end, and fw is a focal length of the zoom lens at the wide-angle end. In this specification, the Abbe number is a value based on the d-line. The overall optical length is a distance on the optical axis from a lens surface on the object side of the first lens unit L1 to a lens surface on the image side of the fourth lens unit L4 plus the back focus. In a case where a glass block or the like is placed in the back focus, an extended amount caused by the glass block, etc. is also added to the back focus.

Inequality (1) defines the minimum value of the Abbe number of the negative lens included in the second lens unit L2. In a case where the value of ν2n becomes lower than the lower limit of inequality (1), the longitudinal chromatic aberration tends to be overcorrected, especially on a short wavelength side. In a case where the value of ν2n becomes higher than the upper limit of inequality (1), it becomes difficult to correct longitudinal chromatic aberration.

Inequality (2) defines a ratio of the focal length of the second lens unit L2 to the focal length of the fourth lens unit L4. In inequality (2), the value of f2/f4 never becomes lower than the lower limit. In a case where the value of f2/f4 becomes higher than the upper limit of inequality (2), efficient zooming becomes difficult and the overall length becomes too long to secure the desired magnification variation ratio.

Inequality (3) defines a ratio of the overall optical length at the wide-angle end to the focal length of the zoom lens at the wide-angle end. In a case where the value of Lw/fw becomes lower than the lower limit of inequality (3), a wide angle cannot be obtained. Alternatively, in order to widen the angle of view, the refractive power of the first lens unit L1 may be increased and it becomes difficult to correct curvature of field and lateral chromatic aberration. In a case where the value of Lw/fw becomes higher than the upper limit of inequality (3), the overall length becomes long.

Inequalities (1) to (3) may be replaced with inequalities (1a) to (3a) below:

$$20.2 < \nu 2n < 27.7 \tag{1a}$$

$$0.120 < f2/f4 < 0.395 \tag{2a}$$

$$13 < Lw/fw < 26 \tag{3a}$$

Inequalities (1) to (3) may be replaced with inequalities (1b) to (3b) below:

$$20.3 < \nu 2n < 27.6 \tag{1b}$$

$$0.130 < f2/f4 < 0.393 \tag{2b}$$

$$13.5 < Lw/fw < 25.5 \tag{3b}$$

A description will now be given of the configurations that may be satisfied in the zoom lens according to each example.

The first lens unit L1 may include three lenses or less. A large number of lenses is beneficial in correcting aberrations, but may easily increase the diameter of the front lens, overall length, and weight of the first lens unit L1 or the entire zoom lens.

A description will now be given of conditions that may be satisfied by the zoom lens according to each example. The zoom lens according to each example may satisfy one or more of the following inequalities (4) to (10):

$$0.00 < f1/f3 < 0.41 \quad (4)$$

$$-0.95 < f1/f2 < -0.55 \quad (5)$$

$$-0.48 < f2/f3 < -0.12 \quad (6)$$

$$-1.43 < f3/f4 < -0.63 \quad (7)$$

$$-1.51 < D1/f1 < -0.81 \quad (8)$$

$$0.00 < D34w/Lw < 0.03 \quad (9)$$

$$3.4 < z < 9.0 \quad (10)$$

where f1 is a focal length of the first lens unit L1, f3 is a focal length of the third lens unit L3, D1 is a distance on the optical axis from a lens surface closest to the object to a lens surface closest to the image plane of the first lens unit L1, D34w is a distance on the optical axis between a lens surface closest to the image plane of the third lens unit L3 and a lens surface closest to the object of the fourth lens unit L4 at the wide-angle end, and z is a magnification variation ratio.

Inequality (4) defines a ratio of the focal length of the first lens unit L1 to the focal length of the third lens unit L3. In inequality (4), the value of f1/f3 is never lower than the lower limit. In a case where the value of f1/f3 becomes higher than the upper limit of inequality (4), the refractive power of the first lens unit L1 becomes weak and a wider angle becomes difficult.

Inequality (5) defines a ratio of the focal length of the first lens unit L1 to the focal length of the second lens unit L2. In a case where the value of f1/f2 becomes lower than the lower limit of inequality (5), a wider angle becomes difficult. In a case where the value of f1/f2 becomes higher than the upper limit of inequality (5), it becomes difficult to correct curvature of field and lateral chromatic aberration. Alternatively, efficient zooming becomes difficult, and the overall length becomes too long to secure the desired magnification variation ratio.

Inequality (6) defines a ratio of the focal length of the second lens unit L2 to the focal length of the third lens unit L3. In a case where the value of f2/f3 becomes lower than the lower limit of inequality (6), efficient zooming becomes difficult, and the overall length becomes too long to secure the desired magnification variation ratio. In a case where the value of f2/f3 becomes higher than the upper limit of inequality (6), it becomes difficult to correct spherical aberration and coma. Inequality (7) defines a ratio of the focal length of the third lens unit L3 to the focal length of the fourth lens unit L4. In a case where the value of f3/f4 becomes lower than the lower limit of inequality (7), it becomes difficult to suppress fluctuations in curvature of field during zooming. In a case where the value of f3/f4 becomes higher than the upper limit of inequality (7), it becomes difficult to suppress fluctuations in spherical aberration during zooming.

Inequality (8) defines a ratio of the distance on the optical axis from the lens surface closest to the object to the lens surface closest to the image plane of the first lens unit L1 to the focal length of the first lens unit L1. In a case where the value of D1/f1 becomes lower than the lower limit of inequality (8), the diameter of the front lens, overall length, and weight of the zoom lens may increase. In a case where the value of D1/f1 becomes higher than the upper limit of inequality (8), satisfying both a wider angle and aberrational corrections becomes difficult.

Inequality (9) defines a ratio of the distance on the optical axis from the lens surface closest to the image lane of the third lens unit L3 to the lens surface closest to the object of the fourth lens unit L4 at the wide-angle end to the overall optical length at the wide-angle end. In inequality (9), the value of D34w/Lw is never lower than the lower limit. In a case where the value of D34w/Lw becomes higher than the upper limit in inequality (9), it becomes difficult to suppress fluctuations in spherical aberration during zooming.

Inequality (10) defines the magnification variation ratio. In a case where the value of z becomes lower than the lower limit of inequality (10), the necessity of the present disclosure decreases. In a case where the value of z becomes higher than the upper limit of inequality (10), the diameter of the front lens, overall length, and weight of the zoom lens may increase.

Inequalities (4) to (10) may be replaced with inequalities (4a) to (10a) below:

$$0.10 < f1/f3 < 0.39 \quad (4a)$$

$$-0.90 < f1/f2 < -0.58 \quad (5a)$$

$$-0.46 < f2/f3 < -0.13 \quad (6a)$$

$$-1.37 < f3/f4 < -0.66 \quad (7a)$$

$$-1.44 < D1/f1 < -0.85 \quad (8a)$$

$$0.010 < D34w/Lw < 0.025 \quad (9a)$$

$$3.6 < z < 8.5 \quad (10a)$$

Inequalities (4) to (10) may be replaced with inequalities (4b) to (10b) below:

$$0.11 < f1/f3 < 0.38 \quad (4b)$$

$$-0.88 < f1/f2 < -0.60 \quad (5b)$$

$$-0.45 < f2/f3 < -0.14 \quad (6b)$$

$$-1.30 < f3/f4 < -0.68 \quad (7b)$$

$$-1.40 < D1/f1 < -0.90 \quad (8b)$$

$$0.010 < D34w/Lw < 0.020 \quad (9b)$$

$$3.7 < z < 8.0 \quad (10b)$$

Numerical examples 1 to 5 corresponding to Examples 1 to 5, respectively, will be illustrated below.

In the surface data of each numerical example, r represents a radius of curvature of each optical surface, and d (mm) represents an on-axis distance (distance on the optical axis) between m-th and (m+1)-th surfaces, where m is a surface number counted from the light incident side. nd represents a refractive index of each optical member for the d-line, and vd represents an Abbe number of the optical member. The Abbe number of a certain material is represented as follows:

$$\nu d = (Nd - 1)/(NF - NC)$$

where Nd, NF, and NC are refractive indexes of the d-line (587.6 nm), F-line (486.1 nm), and C-line (656.3 nm) in the Fraunhofer line.

In each numerical example, d, focal length (mm), F-number, and half angle of view (degrees) are all values when the zoom lens according to each example is in an in-focus state on an object at infinity. The half angle of view is a value determined by ray tracing. A "back focus" is a distance on the optical axis from the final lens surface (lens surface closest to the image plane) to the paraxial image surface, expressed as an air equivalent length, and is a value when the glass block is not included. The "overall lens length" is a length of the zoom lens that does not include the glass block, adding the back focus to a distance on the optical axis from the frontmost surface (lens surface closest to an object) to the final surface. WIDE represents the wide-angle end, MIDDLE represents an intermediate (middle) zoom position, TELE represents a telephoto end.

In a case where the optical surface is an aspherical surface, an asterisk * is added to the right side of the surface number. The aspherical shape is expressed as follows:

$$X = (h^2/R)/\left[1 + \{1 - (1+k)(h/R)^2\}^{1/2}\right] + A4\times h^4 + A6\times h^6 + A8\times h^8 + A10\times h^{10}$$

where X is a displacement amount from the surface vertex in the optical axis direction, h is a height from the optical axis in the direction perpendicular to the optical axis, R is a paraxial radius of curvature, K is a conical constant, and A4, A6, A8, and A10 are aspherical coefficients of each order. "e±XX" in each aspherical coefficient means "$\times 10^{\pm XX}$." Coefficients not listed in each numerical example are zero.

NUMERICAL EXAMPLE 1
UNIT: mm

SURFACE DATA

| Surface No. | r | d | nd | νd |
|---|---|---|---|---|
| 1 | 72.527 | 0.93 | 1.59522 | 67.7 |
| 2 | 11.379 | 5.79 | | |
| 3 | −27.255 | 0.67 | 1.72916 | 54.7 |
| 4 | 13.849 | 0.20 | | |
| 5 | 14.878 | 2.22 | 1.95906 | 17.5 |
| 6 | 34.667 | (Variable) | | |
| 7 (SP) | ∞ | 0.10 | | |
| 8* | 13.773 | 5.10 | 1.55332 | 71.7 |
| 9* | −36.742 | 0.17 | | |
| 10 | 16.256 | 3.33 | 1.95375 | 32.3 |
| 11 | −26.737 | 0.60 | 1.85478 | 24.8 |
| 12 | 9.491 | 4.20 | | |
| 13 | 15.713 | 0.60 | 1.85478 | 24.8 |
| 14 | 12.031 | 4.66 | 1.59522 | 67.7 |
| 15 | −17.062 | (Variable) | | |
| 16 | −17.547 | 0.82 | 1.95906 | 17.5 |
| 17 | −13.209 | 1.16 | | |
| 18 | −10.722 | 0.60 | 1.67270 | 32.1 |
| 19 | −29.412 | (Variable) | | |

-continued

NUMERICAL EXAMPLE 1
UNIT: mm

| Surface No. | r | d | nd | νd |
|---|---|---|---|---|
| 20 | 9.948 | 0.88 | 1.89190 | 37.1 |
| 21 | 12.792 | 2.61 | | |
| 22 | ∞ | 0.80 | 1.51633 | 64.1 |
| 23 | ∞ | 1.00 | | |
| Image Plane | ∞ | | | |

ASPHERIC DATA

8th Surface
K = −1.57466e+00
9th Surface
K = 0.00000e+00 A 4 = 5.62163e−05

VARIOUS DATA
ZOOM RATIO 4.92

| | WIDE | MIDDLE | TELE |
|---|---|---|---|
| Focal Length | 3.62 | 9.96 | 17.81 |
| Fno | 1.44 | 2.19 | 2.58 |
| Half Angle of View (°) | 56.26 | 18.60 | 10.30 |
| Image Height | 3.20 | 3.20 | 3.20 |
| Overall Lens Length | 68.73 | 56.09 | 59.31 |
| BF | 4.14 | 4.14 | 4.14 |
| d6 | 30.63 | 8.04 | 1.31 |
| d15 | 0.96 | 2.18 | 8.90 |
| d19 | 0.98 | 9.71 | 12.94 |

ZOOM LENS UNIT DATA

| Lens Unit | Starting Surface | Focal Length |
|---|---|---|
| 1 | 1 | −10.17 |
| 2 | 7 | 14.01 |
| 3 | 16 | −50.21 |
| 4 | 20 | 43.78 |

NUMERICAL EXAMPLE 2
UNIT: mm

SURFACE DATA

| Surface No. | r | d | nd | νd |
|---|---|---|---|---|
| 1 | 56.058 | 0.98 | 1.69680 | 55.5 |
| 2 | 9.735 | 7.38 | | |
| 3* | −24.519 | 0.68 | 1.76802 | 49.2 |
| 4 | 27.444 | 2.10 | 1.95906 | 17.5 |
| 5 | 1715.781 | (Variable) | | |
| 6 (SP) | ∞ | 0.08 | | |
| 7* | 11.055 | 3.68 | 1.59201 | 67.0 |
| 8* | −39.998 | 0.87 | | |
| 9 | 23.181 | 3.61 | 2.00100 | 29.1 |
| 10 | −14.983 | 0.60 | 1.85478 | 24.8 |
| 11 | 8.242 | 2.91 | | |
| 12 | 13.110 | 3.96 | 1.49700 | 81.5 |
| 13 | −15.918 | (Variable) | | |
| 14 | −20.364 | 0.91 | 1.49710 | 81.6 |
| 15* | −36.032 | (Variable) | | |
| 16 | 10.707 | 1.59 | 1.69680 | 55.5 |
| 17 | 11.851 | 2.61 | | |
| 18 | ∞ | 0.80 | 1.51633 | 64.1 |
| 19 | ∞ | 1.00 | | |
| Image Plane | ∞ | | | |

ASPHERIC DATA

3rd Surface
K = 1.28585e+00 A 4 = 2.45808e−05
7th Surface
K = −1.93828e+00 A 4 = 7.55192e−05

-continued

NUMERICAL EXAMPLE 2
UNIT: mm

8th Surface
K = −9.08920e−01 A 4 = 9.41364e−05
15th Surface
K = −1.09444e+00 A 4 = 4.35236e−05

VARIOUS DATA
ZOOM RATIO 4.92

| | WIDE | MIDDLE | TELE |
|---|---|---|---|
| Focal Length | 3.48 | 9.74 | 17.13 |
| Fno | 1.44 | 2.23 | 2.58 |
| Half Angle of View (°) | 57.33 | 19.00 | 10.73 |
| Image Height | 3.20 | 3.20 | 3.20 |
| Overall Lens Length | 69.04 | 52.98 | 55.37 |
| BF | 4.14 | 4.14 | 4.14 |
| d5 | 32.71 | 7.52 | 0.78 |
| d13 | 1.78 | 2.53 | 10.59 |
| d15 | 1.07 | 9.45 | 10.51 |

ZOOM LENS UNIT DATA

| Lens Unit | Starting Surface | Focal Length |
|---|---|---|
| 1 | 1 | −10.64 |
| 2 | 6 | 13.73 |
| 3 | 14 | −96.06 |
| 4 | 16 | 101.38 |

NUMERICAL EXAMPLE 3
UNIT: mm

SURFACE DATA

| Surface No. | r | d | nd | νd |
|---|---|---|---|---|
| 1 | 43.824 | 0.66 | 1.80400 | 46.5 |
| 2 | 9.455 | 4.24 | | |
| 3 | −16.906 | 0.60 | 1.69930 | 51.1 |
| 4 | 12.794 | 0.26 | | |
| 5 | 15.208 | 1.89 | 1.95906 | 17.5 |
| 6 | 83.820 | (Variable) | | |
| 7 (SP) | ∞ | 0.18 | | |
| 8* | 10.864 | 2.35 | 1.59201 | 67.0 |
| 9* | −26.966 | 1.88 | | |
| 10 | 14.568 | 1.98 | 1.95375 | 32.3 |
| 11 | −15.399 | 0.87 | 1.85478 | 24.8 |
| 12 | 7.401 | 3.30 | | |
| 13 | 11.993 | 2.10 | 1.49700 | 81.5 |
| 14 | −12.195 | (Variable) | | |
| 15 | −26.067 | 1.12 | 1.92286 | 18.9 |
| 16 | −13.596 | 0.99 | | |
| 17 | −9.228 | 0.60 | 2.00100 | 29.1 |
| 18 | −25.318 | (Variable) | | |
| 19 | 12.116 | 0.86 | 1.85150 | 40.8 |
| 20 | 17.551 | 2.61 | | |
| 21 | ∞ | 0.80 | 1.51633 | 64.1 |
| 22 | ∞ | 1.00 | | |
| Image Plane | ∞ | | | |

ASPHERIC DATA

8th Surface
K = −1.73438e+00 A 4 = −9.56202e−06
9th Surface
K = −1.01922e+00 A 4 = 8.83438e−05

-continued

NUMERICAL EXAMPLE 3
UNIT: mm

VARIOUS DATA
ZOOM RATIO 4.90

| | WIDE | MIDDLE | TELE |
|---|---|---|---|
| Focal Length | 3.64 | 10.16 | 17.85 |
| Fno | 1.96 | 3.41 | 5.05 |
| Half Angle of View (°) | 56.24 | 18.20 | 10.26 |
| Image Height | 3.20 | 3.20 | 3.20 |
| Overall Lens Length | 49.93 | 44.39 | 49.92 |
| BF | 4.13 | 4.13 | 4.13 |
| d6 | 20.17 | 4.99 | 0.89 |
| d14 | 0.81 | 2.38 | 5.54 |
| d18 | 0.92 | 8.98 | 15.45 |

ZOOM LENS UNIT DATA

| Lens Unit | Starting Surface | Focal Length |
|---|---|---|
| 1 | 1 | −8.24 |
| 2 | 7 | 11.23 |
| 3 | 15 | −30.04 |
| 4 | 19 | 42.82 |

NUMERICAL EXAMPLE 4
UNIT: mm

SURFACE DATA

| Surface No. | r | d | nd | νd |
|---|---|---|---|---|
| 1 | 71.188 | 1.29 | 1.49700 | 81.5 |
| 2 | 14.006 | 8.00 | | |
| 3 | −35.563 | 0.86 | 1.77250 | 49.6 |
| 4 | 16.513 | 0.17 | | |
| 5 | 17.223 | 2.79 | 1.95906 | 17.5 |
| 6 | 39.260 | (Variable) | | |
| 7 (SP) | ∞ | 0.09 | | |
| 8* | 12.544 | 3.78 | 1.59201 | 67.0 |
| 9* | −98.106 | 0.17 | | |
| 10 | 14.787 | 3.12 | 1.71300 | 53.9 |
| 11 | −345.490 | 0.60 | 1.72825 | 28.5 |
| 12 | 9.231 | 4.68 | | |
| 13 | −17.632 | 0.72 | 1.69680 | 55.5 |
| 14 | −16.355 | 0.17 | | |
| 15 | 15.660 | 0.60 | 1.89286 | 20.4 |
| 16 | 13.461 | 3.97 | 1.59522 | 67.7 |
| 17 | −36.323 | (Variable) | | |
| 18 | −39.722 | 1.17 | 1.95906 | 17.5 |
| 19 | −16.902 | 1.13 | | |
| 20 | −12.305 | 0.60 | 1.78880 | 28.4 |
| 21 | −533.810 | (Variable) | | |
| 22 | 11.894 | 0.92 | 1.88300 | 40.8 |
| 23 | 17.308 | 2.60 | | |
| 24 | ∞ | 0.80 | 1.51633 | 64.1 |
| 25 | ∞ | 1.00 | | |
| Image Plane | ∞ | | | |

ASPHERIC DATA

8th Surface
K = −3.20404e−01 A 4 = −2.55905e−05
9th Surface
K = 2.83697e+00 A 4 = 4.40781e−05

VARIOUS DATA
ZOOM RATIO 7.95

| | WIDE | MIDDLE | TELE |
|---|---|---|---|
| Focal Length | 3.65 | 14.34 | 28.98 |
| Fno | 1.44 | 2.58 | 3.30 |
| Half Angle of View (°) | 55.62 | 12.80 | 6.30 |

| NUMERICAL EXAMPLE 4 UNIT: mm | | | |
|---|---|---|---|
| Image Height | 3.20 | 3.20 | 3.20 |
| Overall Lens Length | 89.00 | 65.07 | 70.70 |
| BF | 4.13 | 4.13 | 4.13 |
| d6 | 48.00 | 9.90 | 1.34 |
| d17 | 1.09 | 2.36 | 10.54 |
| d21 | 0.96 | 13.87 | 19.86 |

ZOOM LENS UNIT DATA

| Lens Unit | Starting Surface | Focal Length |
|---|---|---|
| 1 | 1 | −13.33 |
| 2 | 7 | 15.58 |
| 3 | 18 | −36.06 |
| 4 | 22 | 39.87 |

NUMERICAL EXAMPLE 5
UNIT: mm

SURFACE DATA

| Surface No. | r | d | nd | νd |
|---|---|---|---|---|
| 1 | 38.799 | 0.71 | 1.83481 | 42.7 |
| 2 | 9.795 | 6.07 | | |
| 3 | −14.573 | 0.60 | 1.77250 | 49.6 |
| 4 | 13.140 | 0.72 | | |
| 5 | 15.290 | 1.94 | 1.95906 | 17.5 |
| 6 | 104.715 | (Variable) | | |
| 7 (SP) | ∞ | 0.14 | | |
| 8* | 9.539 | 4.38 | 1.58313 | 59.4 |
| 9* | −45.724 | 1.07 | | |
| 10 | 23.764 | 1.48 | 1.69680 | 55.5 |
| 11 | −30.067 | 0.60 | 1.75520 | 27.5 |
| 12 | 8.475 | 1.67 | | |
| 13 | 13.371 | 2.39 | 1.55200 | 70.7 |
| 14 | −11.277 | (Variable) | | |
| 15 | −33.738 | 0.83 | 1.95906 | 17.5 |
| 16 | −14.786 | 1.50 | | |
| 17 | −12.441 | 0.60 | 2.05090 | 26.9 |
| 18 | −115.470 | (Variable) | | |
| 19 | 15.567 | 1.20 | 1.55200 | 70.7 |
| 20 | 184.405 | 2.60 | | |
| 21 | ∞ | 0.80 | 1.51633 | 64.1 |
| 22 | ∞ | 1.00 | | |
| Image Plane | ∞ | | | |

ASPHERIC DATA

8th Surface
K = −1.97205e+00 A 4 = 1.86383e−04
9th Surface
K = −8.69262e−01 A 4 = 3.02826e−04

VARIOUS DATA
ZOOM RATIO 3.80

| | WIDE | MIDDLE | TELE |
|---|---|---|---|
| Focal Length | 3.69 | 7.24 | 14.02 |
| Fno | 1.96 | 3.95 | 4.73 |
| Half Angle of View (°) | 55.88 | 25.74 | 13.07 |
| Image Height | 3.20 | 3.20 | 3.20 |
| Overall Lens Length | 53.23 | 53.23 | 53.23 |
| BF | 4.12 | 4.12 | 4.12 |
| d6 | 18.55 | 10.50 | 2.44 |
| d14 | 3.71 | 1.05 | 10.63 |
| d18 | 0.95 | 11.66 | 10.13 |

NUMERICAL EXAMPLE 5
UNIT: mm

ZOOM LENS UNIT DATA

| Lens Unit | Starting Surface | Focal Length |
|---|---|---|
| 1 | 1 | −7.36 |
| 2 | 7 | 11.98 |
| 3 | 15 | −28.79 |
| 4 | 19 | 30.72 |

Table I summarizes various values of each numerical example.

TABLE 1

| INEQUALITY | NUMERICAL EXAMPLE 1 | 2 | 3 | 4 | 5 |
|---|---|---|---|---|---|
| (1) | 24.80 | 24.80 | 24.80 | 20.36 | 27.51 |
| (2) | 0.320 | 0.135 | 0.262 | 0.391 | 0.390 |
| (3) | 19.051 | 19.922 | 13.788 | 24.488 | 14.503 |
| (4) | 0.202 | 0.111 | 0.274 | 0.370 | 0.256 |
| (5) | −0.726 | −0.775 | −0.734 | −0.856 | −0.614 |
| (6) | −0.279 | −0.143 | −0.374 | −0.432 | −0.416 |
| (7) | −1.147 | −0.948 | −0.701 | −0.904 | −0.937 |
| (8) | −0.966 | −1.047 | −0.930 | −0.983 | −1.365 |
| (9) | 0.014 | 0.015 | 0.018 | 0.011 | 0.018 |
| (10) | 4.92 | 4.92 | 4.90 | 7.95 | 3.80 |

Image Pickup Apparatus

Figure 11:
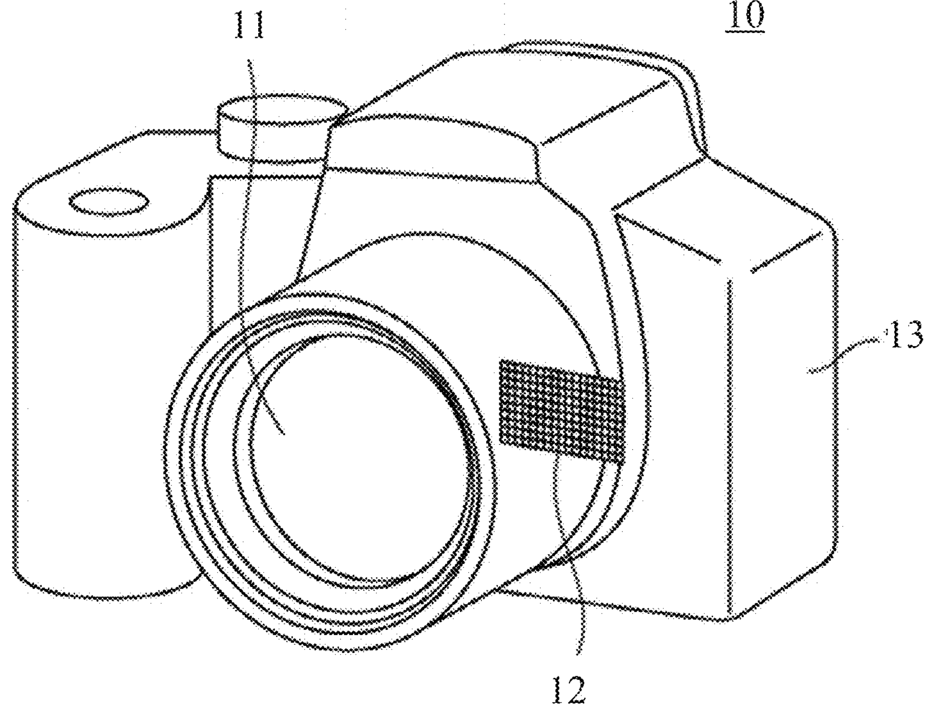
FIG. 11 is a schematic diagram of an image pickup apparatus.

Referring now to FIG. 11, a description will be given of an illustrative digital still camera (image pickup apparatus) using the zoom lens according to any one of the above examples as an imaging optical system. In FIG. 11, reference numeral 10 denotes a camera body, and reference numeral 11 denotes an imaging optical system constituted by any of the zoom lenses described in Examples 1 to 5. Reference numeral 12 denotes a solid-state image sensor (photoelectric conversion element) such as a CCD sensor or a CMOS sensor, which is built into the camera body and receives an optical image formed by the imaging optical system 11 and photoelectrically converts it. The camera body 10 may be a so-called single-lens reflex camera with a quick turn mirror, or a so-called mirrorless camera without a quick turn mirror.

Thus, applying the zoom lens according to each example to an image pickup apparatus such as a digital still camera can provide an image pickup apparatus having a compact lens.

Image Pickup System

An image pickup system (surveillance camera system) may include the zoom lens according to any one of the above examples and a control unit configured to control the zoom lens. In this case, the control unit can control the zoom lens so that each lens unit moves as described above during zooming, focusing, and image stabilization. At this time, the control unit does not need to be integrated with the zoom lens, and may be separate from the zoom lens. For example, a control apparatus may be located distant from a driving unit configured to drive each lens in a zoom lens and include a transmitter configured to transmit a control signal (command) to control the zoom lens. This control unit can remotely control the zoom lens.

The control unit may include an operation unit such as a controller or a button configured to remotely control the zoom lens, so that the zoom lens is controlled in accordance with user input to the operation unit. For example, the operation unit may include an enlargement button and a reduction button. In this case, the control unit sends a signal to the driving unit in the zoom lens so that when the user presses the enlargement button, the magnification of the zoom lens increases, and when the user presses the reduce button, the magnification of the zoom lens decreases.

The image pickup system may include a display unit such as a liquid crystal panel configured to display information regarding zooming (moving state) of the zoom lens. The information regarding the zoom of the zoom lens includes, for example, a zoom magnification (zoom state) and a moving amount (moving state) of each lens unit. In this case, the user can remotely operate the zoom lens via the operation unit while viewing information regarding the zoom of the zoom lens illustrated on the display unit. The display unit and the operation unit may be integrated, for example, by employing a touch panel or the like.

Figures 12A, 12B:
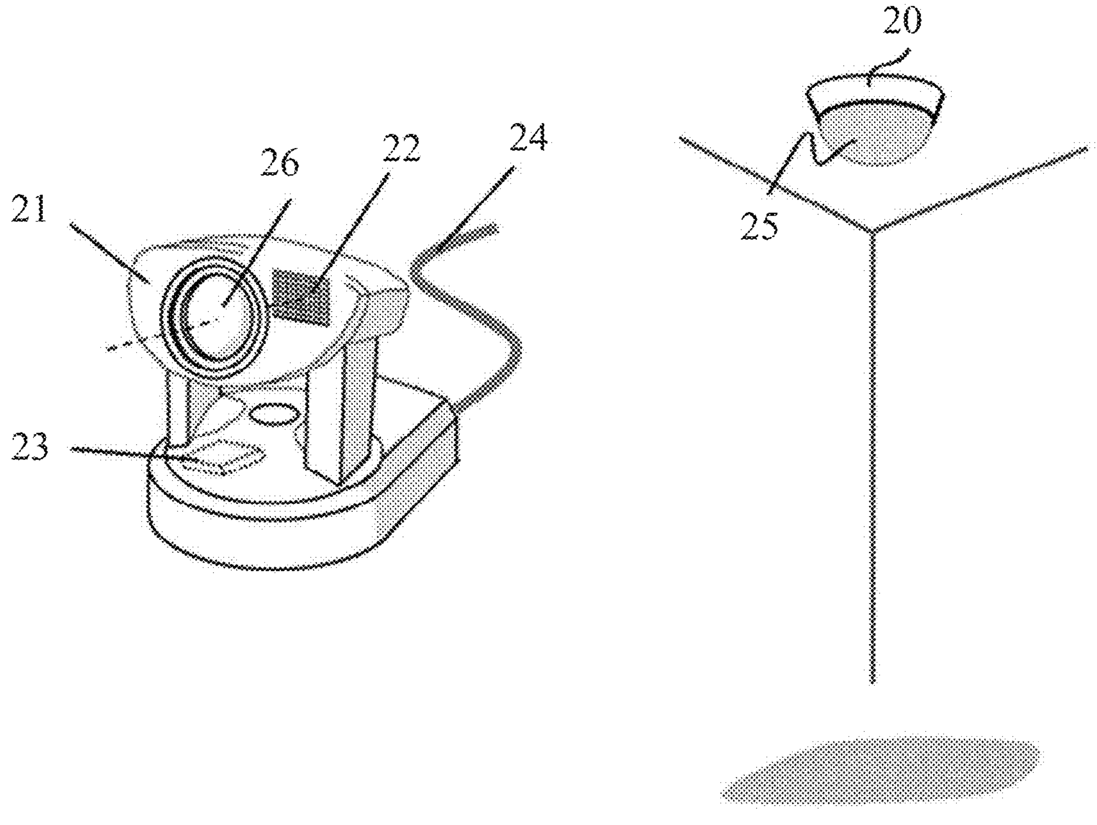
FIGS. 12A and 12B are schematic diagrams of the image pickup apparatus.

FIGS. 12A and 12B are schematic diagrams of an image pickup apparatus (surveillance camera) using the zoom lens according to each example as an imaging optical system.

In FIG. 12A, reference numeral 21 denotes a surveillance camera body, and reference numeral 22 denotes a solid-state image sensor (photoelectric conversion element), such as a CCD sensor or a CMOS sensor, which is built into the camera body and receives an object image formed by the lens unit 26. Reference numeral 23 denotes a memory unit that records information corresponding to the object image photoelectrically converted by the solid-state image sensor 22. Reference numeral 24 denotes a network cable for transferring the object image photoelectrically converted by the solid-state image sensor 22.

FIG. 12B illustrates an example in which the image pickup apparatus is used with a dome-shaped cover 25 attached and attached to the ceiling. Reference numeral 20 denotes a portion not covered by the dome-shaped cover 25.

Thus, applying the image pickup apparatus according to this example to an optical apparatus such as a surveillance camera can provide a compact optical apparatus with high optical performance.

The image pickup apparatus is not limited to surveillance cameras, and can also be used for video cameras, digital cameras, etc.

In a case where an electronic image sensor such as a CCD is used as the image sensor, the quality of the output image can be further improved by electronically correcting aberrations.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a zoom lens that can have a small size, a wide angle, and high optical performance.

This application claims priority to Japanese Patent Application No. 2023-103651, which was filed on Jun. 23, 2023, and which is hereby incorporated by reference herein in its entirety.

What is claimed is:

1. A zoom lens comprising:

a plurality of lens units including, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming, wherein the second lens unit includes at least one negative lens, and wherein the following inequalities are satisfied:

$$20 < v2n < 28$$

$$0.00 < f2/f4 < 0.40$$

$$12 < Lw/fw < 55$$

where v2n is a minimum value of an Abbe number of the negative lens, f2 is a focal length of the second lens unit, f4 is a focal length of the fourth lens unit, Lw is an overall optical length of the zoom lens at a wide-angle end, and fw is a focal length of the zoom lens at the wide-angle end.

2. The zoom lens according to claim 1, wherein the following inequality is satisfied:

$$0.00 < f1/f3 < 0.41$$

where f1 is a focal length of the first lens unit, and f3 is a focal length of the third lens unit.

3. The zoom lens according to claim 1, wherein the following inequality is satisfied:

$$-0.95 < f1/f2 < -0.55$$

where f1 is a focal length of the first lens unit.

4. The zoom lens according to claim 1, wherein the following inequality is satisfied:

$$-0.48 < f2/f3 < -0.12$$

where f3 is a focal length of the third lens unit.

5. The zoom lens according to claim 1, wherein the following inequality is satisfied:

$$-1.43 < f3/f4 < -0.63$$

where f3 is a focal length of the third lens unit.

6. The zoom lens according to claim 1, wherein the first lens unit includes three lenses or less.

7. The zoom lens according to claim 1, wherein the following inequality is satisfied:

$$-1.51 < D1/f1 < -0.81$$

where D1 is a distance on an optical axis from a lens surface closest to an object to a lens surface closest to an image plane of the first lens unit, and f1 is a focal length of the first lens unit.

8. The zoom lens according to claim 1, wherein the following inequality is satisfied:

$$0.00 < D34w/Lw < 0.03$$

where D34w is a distance on an optical axis from a lens surface closest to an image plane of the third lens unit to a lens surface closest to an object of the fourth lens unit at the wide-angle end.

9. The zoom lens according to claim 1, wherein the following inequality is satisfied:

$$3.4 < z < 9.0$$

where z is a magnification variation ratio.

10. The zoom lens according to claim 1, wherein the second lens unit at a telephoto end is located on the object side of the second lens unit at the wide-angle end.

11. An image pickup apparatus comprising:

a zoom lens having a plurality of lens units; and an image sensor configured to receive an image formed by the zoom lens, wherein the plurality of lens units includes, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming, wherein the second lens unit includes at least one negative lens, and wherein the following inequalities are satisfied:

$$20 < \nu 2n < 28$$

$$0.00 < f2/f4 < 0.40$$

$$12 < Lw/fw < 55$$

where ν2n is a minimum value of an Abbe number of the negative lens, f2 is a focal length of the second lens unit, f4 is a focal length of the fourth lens unit, Lw is an overall optical length of the zoom lens at a wide-angle end, and fw is a focal length of the zoom lens at the wide-angle end.

12. An image pickup system comprising:

a zoom lens having a plurality of lens units; and a control unit configured to control the zoom lens during zooming, wherein the plurality of lens units includes, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming, wherein the second lens unit includes at least one negative lens, and wherein the following inequalities are satisfied:

$$20 < \nu 2n < 28$$

$$0.00 < f2/f4 < 0.40$$

$$12 < Lw/fw < 55$$

where ν2n is a minimum value of an Abbe number of the negative lens, f2 is a focal length of the second lens unit, f4 is a focal length of the fourth lens unit, Lw is an overall optical length of the zoom lens at a wide-angle end, and fw is a focal length of the zoom lens at the wide-angle end.

13. The image pickup system according to claim 12, wherein the control unit is separate from the zoom lens, and includes a transmitter configured to transmit a control signal for controlling the zoom lens.

14. The image pickup system according to claim 12, wherein the control unit is separate from the zoom lens, and includes an operation unit configured to operate the zoom lens.

15. The image pickup system according to claim 12, further comprising a display unit configured to display information regarding zooming of the zoom lens.

* * * * *